United States Patent [19]

Yotsumoto

[11] Patent Number: 4,935,297

[45] Date of Patent: Jun. 19, 1990

[54] RUBBER-REINFORCING FIBROUS MATERIALS

[75] Inventor: Toshihiro Yotsumoto, Kodaira, Japan

[73] Assignee: Bridgestone Corporation, Tokyo, Japan

[21] Appl. No.: 185,011

[22] Filed: Apr. 22, 1988

[30] Foreign Application Priority Data

Apr. 22, 1987 [JP] Japan .................................. 62-97603

[51] Int. Cl.$^5$ ........................ B32B 9/00; B32B 25/08
[52] U.S. Cl. ................................. 428/288; 428/289;
428/290; 428/365; 428/367; 428/375; 428/392;
428/394; 428/395; 428/408; 428/414; 428/494;
428/501; 428/519; 428/520; 428/521; 428/522;
428/524
[58] Field of Search ............... 428/375, 392, 394, 395,
428/365, 390, 367, 288, 289, 290, 414, 494, 501,
519, 520, 521, 522, 524, 245, 260, 261, 262, 267,
268, 272, 278, 408; 525/109

[56] References Cited

U.S. PATENT DOCUMENTS

| | | | |
|---|---|---|---|
| 3,775,150 | 11/1973 | McClary | 525/109 |
| 3,898,363 | 8/1975 | Ward et al. | 428/473.5 |
| 4,044,540 | 8/1977 | Toki et al. | 428/378 X |
| 4,536,526 | 8/1985 | Murase | 525/533 X |
| 4,596,854 | 6/1986 | Yotsumoto | 525/133 |
| 4,818,601 | 4/1989 | Itoh et al. | 428/392 X |

FOREIGN PATENT DOCUMENTS

| | | |
|---|---|---|
| 60-99073 | 6/1985 | Japan . |
| 61-14238 | 1/1986 | Japan . |
| 61-166844 | 7/1986 | Japan . |
| 61-238501 | 10/1986 | Japan . |

OTHER PUBLICATIONS

H. H. Nguyen et al., "Influence of Chemical Modification on the Properties of NR and IR Type Vulcanizates", vol. 11, No. 12, pp. 32–34 (1984)/International Polymer Science and Technology.

*Primary Examiner*—Lorraine T. Kendell
*Attorney, Agent, or Firm*—Sughrue, Mion, Zinn, Macpeak & Sseas

[57] ABSTRACT

Rubber-reinforcing fibrous materials are disclosed, which each comprise fibers and a coat formed on the fibers. The coat is formed by applying a rubbery adhesive composition on the fibers and then thermally treating the rubbery adhesive composition-applied fibers. The rubbery adhesive composition is mainly composed of rubber latex and mixed with a bismaleimide compound at a mixing ratio of 0.25 to 5 relative to 100 of the rubber latex in terms of weight.

9 Claims, No Drawings

RUBBER-REINFORCING FIBROUS MATERIALS

BACKGROUND OF THE INVENTION (1) Field of the Invention:

The present invention relates to fibrous materials for reinforcing rubber products such as pneumatic tires, conveyor belts, belts, and hoses. More particularly, the invention relates to rubber-reinforcing fibrous materials having improved heat resisting adhesion for rubber.

(2) Related Art Statement:

As materials for reinforcing products such as tires, conveyor belts, belts, hoses, and air springs, fibrous materials are used in the form of filament chips, cords, cables, cord fabrics, or canvas. In order to reinforce such products as desired, it is important that these fibrous materials are firmly bonded to rubber. It is not an exaggeration to say that this determines use life of rubbery products and intended performances thereof.

Under the circumstances, in order to bond fibrous materials to rubber, there have favorably formerly been used adhesives in which a resin bondable to fibers, such as resorcinol-formaldehyde resin, urea-formaldehyde resin, or phenol-formaldehyde resin, is dispersed in rubber latex.

It is a common practice to use adhesives in such a manner that the adhesive is coated onto fibers, the adhesive and the fibers are bonded, the thus obtained fibrous material is buried in a compounded rubber, and then the compounded rubber is bonded to the fibrous material simultaneously with vulcanization of the compounded rubber. The adhesive used in this technique is called "rubber vulcanizing type adhesive".

However, since the weight of tires, etc. are being reduced in view of recent energy saving demands, there is a tendency that thermal input and dynamic input to be exerted upon products per unit weight becomes greater than before. For this reason, it is necessary to enhance thermal stability of strength, modulus, etc. and fatigue fracture resistance of various components constituting such products. Therefore, it is required that adhesion between the fibrous material and rubber is stable and firm enough to exhibit sufficient use life against such inputs.

However, although an amount of the resorcinol-formaldehyde resin in a conventional resorcinol-formaldehyde latex is increased to more firmly bond the rubber and the fibers through the adhesive, bonding force for the rubber side is lowered. On other hand, even if the bonding force for the rubber side is increased, the bonding force for the fiber side is in turn lowered. Ultimately, conventional adhesives did not satisfy the required performances mentioned above.

It is recited as other fault of the rubber vulcanizing type adhesive that the adhering force vigorously varies depending upon vulcanizing temperatures. That is, while rubbery products are vulcanized at low temperatures to satisfy various performances intended therefor in some cases, an amount of heat applied during vulcanization varies depending upon locations in the case of ununiformly shaped products such as tires, in which the thickness varies. Consequently, ununiform adhesion occurs in resulting products. Therefore, there sometimes occur troubles relating to rubber-fiber adhesion, such as separation, at locations where insufficient heat is applied.

When products such as tires, conveyor belts, etc. are subjected to accelerating tests under far more severer use conditions than as actually used on the market so as to ensure that they fully withstand their specified maximum use life span, the above-mentioned troubles tend to more frequently occur.

From the aforementioned point of view, it is necessary that adhesives used for bonding fibrous materials to rubber exhibit excellent thermal resistance and dynamic fatigue resistance, and that adhesion is less dependent upon the vulcanizing temperature. However, it is an actual situation that such an adhesive as satisfying the above requirements has not been discovered.

SUMMARY OF THE INVENTION

It is therefore an object of the present invention to eliminate the above-mentioned problems, and to provide rubber-reinforcing fibrous materials which exhibit heat-resistive and firm adhesion between the fibrous materials and covering rubber and are less dependent upon vulcanizing temperatures.

Having strenuously made examination to solve the above-mentioned problems, the present inventor has found that product having more excellent performances can be obtained by compounding a specific compound into an adhesive composition as compared with conventional ones. Based on this acknowledgment, he has accomplished the present invention.

That is, the present invention relates to rubber-reinforcing fibrous materials each comprising fibers and a coat formed thereon, the coat being formed by coating, onto the fibers, a rubbering adhesive composition mainly composed of a rubber latex containing a bismaleimide compound at a mixing ratio of from 0.25 to 5 relative to 100 of the rubber latex in terms of weight, and then thermally heating the thus coated fibers.

These and other objects, features, and advantages of the invention will be appreciated upon reading of the following description of the invention when taken in connection with the attached drawings, with the understanding that some modifications, variations, and changes of the same could be made by the skilled person in the art to which the invention pertains without departing from the spirit of the invention or the scope of the claims appended hereto.

DETAILED DESCRIPTION OF THE INVENTION

As bismaleimide compounds to be used in the present invention, use may be made of, for instance, N,N'-ethylenebismaleimide, N,N'-hexamethylenebismaleimide, N,N'-dodecamethylenebismaleimide, N,N'-(2,2,4-trimethylhexamethylene)bismaleimide, N,N'-(oxydipropylene)bismaleimide, N,N'-(amino-dipropylene)bismaleimide, N,N'-(ethylene-dioxy dipropylene)bismaleimide, N,N'-(1,4-cyclyhexylene)bismaleimide, N,N'(1,3-cyclohexylene)bismaleimide, N,N'-(methylene-1,4dicyclohexylene)bismaleimide, N,N'-(isopropylidene-1,4dicyclohexylene)bismaleimide, N,N'-(m-phenylene)-bismaleimide, N,N'-(p-phenylene)bismaleimide, N,N'-(o-phenylene)bismaleimide, N,N'-(1,3-naphthylene)bismaleimide, N,N'-(1,4-naphthylene)bismaleimide, N,N'-(1,5-naphthylene)bismaleimide, N,N'-(3,3-dimethyl 4,4 biphenylene)bismaleimide, N,N'-(3,3-dichloro-4,4bisphenylene)bismaleimide, N,N'-(2,4-pyrydyl)bismaleimide, N,N'-(m-tolylene)bismaleimide, N,N'-(4,6- dimethyl-1,3-phenylene)bismaleimide, N,N'-(4,4-diphenylmethane)bismaleimide, N,N'-(4,4'-diphenylether)bismaleimide, N,N'-(4,4'-diphenylsulfone)bismaleimide, N,N'-(4,4'-diphenyldithio)bismaleimide, etc.

Such bismaleimides in the present invention are used in the form of adhesive compositions together with rubber latex containing a resin having methylene donors. As methylene donor-containing resins, use may favorably be made of resorl type formaldehyde resins such as resorcinol-formaldehyde resin, melamine-formaldehyde resin, and urea-formaldehyde resin, phenol-formaldehyde resin. The most preferable methylene donor-containing resin is a resorcinol-formaldehyde (RF) initial stage condensate obtained by reaction between resorcinol and formaldehyde in the presence of an alkaline catalyst. If necessary, a novolak type formaldehyde resin may be used in combination.

The bismaleimide is added to rubber latex after being dispersed in water. By using a dispersing machine such as a ball mill or a sand mill, the bismaleimide may be dispersed into water with use of an arbitrary anionic surface active agent. However, the bismaleimide compound may be dissolved or dispersed in an organic solvent as the case may be.

According to the present invention, the mixing ratio of the bismaleimide compound to the rubber latex in terms of weight is set at from 0.25/100 to 5/100. That is because the adhesive composition may favorably be used and excellent heat resisting adhesion is exhibited in this range.

The adhesive-treated fibrous materials according to the present invention can be obtained by depositing the thus constituted adhesive composition liquid (hereinafter referred to as "adhesive liquid") on fibers and thermally treating the adhesive-deposited fibers. The fibrous material thus obtained is buried in an unvulcanized compounded rubber, and can firmly be bonded thereto through vulcanization.

The adhesive liquid may be coated onto the fibers by any one of a technique of immersing the fibers thereinto to attach the adhesive liquid thereon, a technique of coating the adhesive liquid onto the fibers with a brush, and a technique of spray-coating. An appropriate technique may be selected depending upon specific cases.

The heat treatment is preferably effected in a range from not less than Tg of a polymer constituting the fibers, and more preferably not less than 100° C. but not more than a value of a fusing temperature minus 20° C. On the other hand, if the fusing temperature is more than 270° C. or has no melting temperature, the thermal treatment is effected at a temperature not more than 250° C. This is because when the thermally treating temperature is more than 250° C., the rubber latex or the fibers are unfavorably deteriorated.

Since the adhesion is greatly improved due to synergistic effects between the fiber adhesive and the covering rubber when the rubber composition mixed with the bismaleimide compound is used as the covering rubber, it is preferable in the present invention to use a rubber composition into which is blended the bismaleimide compound, when the rubber-fiber composite body is to be produced. A preferable mixing rate of the bismaleimide compound to the rubber composition is in a range from 0.5 to 10 parts by weight relative to 100 parts by weight of a rubber component. For, if the mixing rate is less than 0.5 part by weight, an effect of improving the adhesion is lower, while on the other hand, if it is more than 10 parts by weight, the rubber composition itself becomes hard and brittle and the resulting product cannot withstand practical application as a composite material. Further, the above mixing rate of sulfur to the rubber composition is preferably in a range from 0.5 to 1.0 parts by weight. This is because if it is less than 0.5 part by weight, physical properties of a rubber vulcanizate are poor, while on the other hand, if it is more than 10 parts by weight, the rubber composition itself becomes hard and brittle. In either of these cases, the rubber composition cannot be used as a composite material.

As fibers to be used in the present invention, mention may be made of all fiber materials used for reinforcing rubbery products, including aliphatic polyamide fibers represented by rayon, vinylon, 6-nylon, 6,6-nylon, 4,6-nylon, etc., polyester fibers represented by polyethylene terephthalate fibers, aromatic polyamide fibers represented by paraphenylene terephthalamide, and inorganic fibers represented by carbon fibers and glass fibers.

Further, use may be made of the polyester fibers, the aromatic fibers, and the inorganic fibers which have been treated with an epoxy compound or an isocyanate compound during a polymerization step, a spinning step, or a post-treatment, or those which have preliminarily been treated with electron beams, microwaves, discharged corona, plasma, or the like.

The thus obtained fibrous materials may be used in the form of any of cords, cables, filaments, filament chips, cord fibers, canvass, and the like.

For instance, as described in Japanese patent application laid-open Nos. 61-238,501, 61-14,438, and 61-166,684, there has already been known an attempt to improve heat resistance of a rubbering product by blending a bismaleimide compound into a rubber composition. However, the rubber compositions as disclosed in these publications are not to improve adhesion between the rubber compositions and the cords. Thus, heat-resisting adhesion between the fibers and the rubber composition in the rubber-fiber composite material using such a rubber composition has not fully been improved unlike in the present invention.

As for adhesion between an adhesive-treated fibers and rubber to attain the same object as in the present invention, International Polymer Science and Technology, Vol. 11, No. 12, p. 32 (1984) published that a rubber composition blended with 3 parts by weight of m-phenylenebismaleimide had improved adhesion for nylon cords and that the adhesion was maintained even at 100° C. However, this literature has completely no description of details of treatment of cords with an adhesive.

On the other hand, as examples in which a bismaleimide compound is used to treat fibers, Japanese patent publication No. 39-10,514 or Japanese patent application laid-open No. 60-99,073 discloses a method in which when aromatic polyamide fibers are treated in a first bath, that is, with an epoxy compound, the bismaleimide compound is used together with the epoxy compound, and then the fibers are treated with an adhesive of resorcinol-formaldehyde/latex (RFL). However, in this method, the bismaleimide compound is used to cure the epoxy compound, and it was experimentally revealed that they were actually reacted with each other. Therefore, even the fibers are treated by this method, heat-resisting adhesion is not improved. Rather, this method unfavorably deteriorates initial stage adhesion.

The present invention essentially differs from the conventional techniques using the above-mentioned bismaleimide compounds, and mixes the bismaleimide compound into the rubber latex at the specified mixing ratio. Such an attempt has first been made by the present invention, which more greatly improves the heat-resisting adhesion between the adhesive-treated fibers and rubber as compared with the conventional techniques. Such an effect can be attained due to the fact that the bismaleimide compound is cross-linked with the rubber latex and an adhesive layer having excellent heat resistant is formed with the cross-linked product.

In order to further improve heat-resisting adhesion, the present inventor has made various investigations. Consequently, as described before, when the bismaleimide compound is used in the adhesive composition and at the same time a specific amount of the bismaleimide compound is mixed in the rubber composition, extremely excellent heat-resisting adhesion is exhibited due to the synergistic effect.

As mentioned above, since the rubber-reinforcing fibrous materials according to the present invention has extremely excellent heat-resisting adhesion, they can favorably be used in every type of rubber products such as tires, conveyor belts, hoses, and air springs.

Next, the present invention will be explained in more detail with reference to specific examples and comparative examples.

EXAMPLE 1

6,6-nylon was used as a material of fibers, and cords having a twisted construction were each obtained by twisting its 1260 d raw yarns at 39 turns/10 cm for cable twisting and 39 turns/10 cm for ply twisting.

By using N,N'-(m-phenylene)bismaleimide as a bismaleimide compound, a 5% aqueous dispersion liquid of the bismaleimide compound having the following composition was prepared.

Bismaleimide compound aqueous dispersion liquid

|  | Parts by weight |
| --- | --- |
| N,N'-(m-phenylene)bismaleimide | 25 |
| Sodium lignin sulfonate | 2.5 |
| Water | 472.5 |
|  | 500 |

By using the thus prepared bismaleimide compound aqueous dispersion liquid, an adhesive composition liquid A having the following composition was prepared.

Adhesive composition liquid A

|  | Parts by weight | Solid (parts by weight) |
| --- | --- | --- |
| Bismaleimide aqueous dispersion liquid (5%) | 35.5 | 1.775 |
| Vinylpyridine-styrene-butadiene terpolymer rubber latex (41%) | 433.15 | 177.6 |
| RF initial stage condensate liquid (4.0%) | 531.35 | 21.3 |
|  | 1000.0 |  |

The RF initial stage condensate liquid (4.0%) in the adhesive composition liquid A was prepared by aging a composition given below for 24 hours.

RF initial stage condensate liquid

|  | Parts by weight |
| --- | --- |
| Water | 488.51 |
| Resorcinol | 15.12 |
| Formalin (37%) | 16.72 |
| Caustic soda (10% aqueous solution) | 11.0 |
|  | 531.35 |

Next, the above cords were immersed into the thus prepared adhesive composition liquid A, and the cords were then dried at 160° for 60 seconds, and thermally treated at a high temperature of 235° C. for 60 seconds, thereby obtaining adhesive-treated cords.

The initial stage adhesion (kg/cord) between the cord and the rubber was measured as follows;

The adhesive-treated cords were buried in the below-mentioned uncured compounded rubber "a", which was vulcanized at 155° C. for 30 minutes under pressure of 20 kg/cm$^2$. Then, the cords were turned up from the thus obtained vulcanizate, and the cords were peeled therefrom at a speed of 30 cm/min. A peeling-resisting force was measured as the initial stage adhesion (kg/cord).

The adhesion at a high temperature was measured in the same manner as in the measurement of the initial stage adhesion except that the peeling-resisting force was measured in an atmosphere at 120° C.

The adhesion when vulcanization was effected at a low temperature was measured in the same manner as above except that vulcanizing conditions were 125° C. and 100 minutes.

Results obtained were shown in Table 1 below.

Compounded rubber composition "a"

|  | Parts by weight |
| --- | --- |
| Natural rubber | 100 |
| HAF carbon black | 42 |
| Stearic acid | 1.2 |
| Zinc oxide | 5.0 |
| Antioxidant 1,2-dihyroxy-2,2,4-trimethylquinoline | 0.7 |
| Dibenzothiazyl.disulfide | 0.6 |
| N-oxy.diethylene.benzo-thiazylsulfenamide | 0.4 |
| Sulfur | 2.8 |

EXAMPLE 2

Treatments and evaluations were carried out in the same manners as in Example 1 except that 4,6-nylon was used instead of 6,6-nylon in Example 1. Results obtained are shown in Table 1.

EXAMPLE 3

Kevlar fibers [manufactured by Du'Pont, trade name of poly(1,4-terephthalamide) fibers] were used, and twisted cords were each obtained by twisting their 1500 d raw yarns at 32 turns/10 cm for cable twisting and 32 turns/10 cm for ply twisting.

Next, the thus obtained cords were immersed into a pretreating liquid having the below-mentioned composition, which were dried at 160° C. for 60 seconds and thermally treated at a high temperature of 240° C. for 60 seconds. The cords wre treated with the adhesive composition liquid A described in Example 1. Thereafter, the cords were treated and evaluated in the same manners as in Example 1.

Pretreating liquid

|  | Parts by weight |
|---|---|
| Diglycerol triglycidyl ether | 1.20 |
| Sodium dioctylsulfosuccinate (70%) | 0.02 |
| Caustic soda (10% aqueous solution) | 0.14 |
| Water | 98.14 |
|  | 100 |

Results obtained are shown in Table 1.

EXAMPLE 4

Treatments and evaluations were effected in the same manners as in Example 3 except that polyethylene terephthalate fibers were used instead of Kevlar fibers in Example 3, and that 1500 d raw yarns of the former were twisted at 40 turns/10 cm for cable twisting and 40 turns/10 cm for ply twisting. Results obtained are shown in Table 1.

COMPARATIVE EXAMPLES 1–4

Treatments and evaluations were carried out in the same manners as in Examples 1–4 except that an adhesive composition liquid B having the same composition as that of the bismaleimide aqueous dispersion liquid A used in Examples 1–4 but containing no bismaleimide aqueous dispersion liquid.

Adhesive composition liquid "b"

|  | Parts by weight | Solid (parts by weight) |
|---|---|---|
| Vinylpyridine-styrene-butadiene terpolymer rubber latex | 433.15 | 177.6 |
| RF initial stage compensated liquid | 531.25 | 21.3 |
| Water | 35.5 |  |
|  | 1000 |  |

Results obtained are shown in Table 1.

EXAMPLES 5–9

Treatments and evaluations were carried out in the same manner as in Example 1 except that N,N'-ethylenebismaleimide, N,N'-(1,4-cyclohexylene)bismaleimide, N,N'-(1,4-naphthylene)bismaleimide, N,N'-(2,4-pyridyl)bismaleimide, or N,N'-(4,4-diphenylether)-bismaleimide was used instead of N,N'-(m-phenylene)-bismaleimide in Example 1. Results obtained are shown in Table 1.

EXAMPLES 10–13, COMPARATIVE EXAMPLE 5

Treatments and evaluations were carried in the same manners except that the mixing ratio of the bismaleimide compound to the rubber, latex was changed from that in Example 3 to 0.25/100 2.0/100, 2.5/100, 5/100, or 6.5/100. Results obtained are shown in Table 1.

COMPARATIVE EXAMPLE 6

Kevlar fibers were used as a fiber material, and twisted cords were obtained by twisting their 1500d raw yarns at 32 turns/10 cm for cable twisting and 32 turns/10 cm for ply twisting.

Next, the thus obtained cords were immersed into a pretreating liquid prepared by mixing the above bismaleimide compound aqueous dispersion liquid and the pretreating liquid at the following ratio.

| Bismaleimide compound aqueous dispersion liquid | 19.4 |
|---|---|
| Pretreating liquid | 80.6 |
|  | 100.0 |

[bismaleimide compound/epoxy compound=1/1(-weight ratio]

Then, the cords were dried at 160° C. for 60 seconds and thermally treated at a high temperature of 240° C. for 60 seconds. The thus pretreated cords were treated and evaluated in the same manners as in Example 1 except that the cords were treated with the above adhesive composition liquid "b" having the same composition as that of the above adhesive composition liquid "a" excluding the bismaleimide aqueous dispersion liquid. Results obtained were shown in Table 1.

TABLE 1(a)

|  | Example 1 | Example 2 | Example 3 | Example 4 | Example 5 | Example 6 | Example 7 |
|---|---|---|---|---|---|---|---|
| Bismaleimide | N,N'-(m-phenylene)bismaleimide | N,N'-(m-phenylene)bismaleimide | N,N'-(m-phenylene)bismaleimide | N,N'-(m-phenylene)bismaleimide | N,N'-ethylene bismaleimide | N,N'-(1,4-cyclo-hexylene)bismaleimide | N,N'-(1,4-naphthylene)bismaleimide |
| Fiber | 6,6-nylon | 4,6-nylon | poly(1,4-tereph-thalamide) | polyethylene tereph-thalate | 6,6-nylon | 6,6-nylon | 6,6-nylon |
| Mixing ratio of bis-maleimide/latex | 1/100 | 1/100 | 1/100 | 1/100 | 1/100 | 1/100 | 1/100 |
| Initial stage adhesion | 2.88 | 2.90 | 3.20 | 3.24 | 2.76 | 2.80 | 2.86 |
| Adhesion under high temperature | 1.82 | 1.68 | 1.82 | 1.86 | 1.68 | 1.72 | 1.76 |
| Adhesion when vulcanized at low temperature | 2.52 | 2.44 | 2.56 | 2.32 | 2.44 | 2.32 | 2.38 |

TABLE 1(b)

|  | Example 8 | Example 9 | Example 10 | Example 11 | Example 12 | Example 13 |
|---|---|---|---|---|---|---|
| Bismaleimide | N,N'-(2,4-pyridyl) bismaleimide | N,N'-(4,4-diphenylether) bismaleimide | N,N'-(m-phenylene) bismaleimide | N,N'-(m-phenylene) bismaleimide | N,N'-(m-phenylene) bismaleimide | N,N'-(m-phenylene) bismaleimide |
| Fiber | 6,6-nylon | 6,6-nylon | poly(1,4-terephthalamide) | poly(1,4-terephthalamide) | poly(1,4-terephthalamide) | poly(1,4-terephthalamide) |
| Mixing ratio of bismaleimide/latex | 1/100 | 1/100 | 0.25/100 | 2/100 | 2.5/100 | 5/100 |
| Initial stage adhesion | 2.66 | 2.84 | 3.10 | 3.18 | 3.12 | 3.00 |
| Adhesion under high temperature | 1.68 | 1.84 | 1.52 | 1.84 | 1.74 | 1.58 |
| Adhesion when vulcanized at low temperature | 2.30 | 2.48 | 2.22 | 2.50 | 2.32 | 1.86 |

TABLE 1(c)

|  | Comparative Example 1 | Comparative Example 2 | Comparative Example 3 | Comparative Example 4 | Comparative Example 5 | Comparative Example 6 |
|---|---|---|---|---|---|---|
| Bismaleimide | — | — | — | — | N,N'-(m-phenylene) bismaleimide | *N,N'-(m-phenylene) bismaleimide |
| Fiber | 6,6-nylon | 4,6-nylon | poly(1,4-terephthalamide) | polyethylene terephthalate | poly(1,4-terephthalamide) | poly(1,4-terephthalamide) |
| Mixing ratio of bismaleimide/latex | 0/100 | 0/100 | 0/100 | 0/100 | 6.5/100 | 1/100 |
| Initial stage adhesion | 2.50 | 2.52 | 2.92 | 2.95 | 2.86 | 2.34 |
| Adhesion under high temperature | 1.21 | 1.30 | 1.12 | 1.32 | 1.08 | 0.66 |
| Adhesion when vulcanized at low temperature | 1.40 | 1.44 | 1.56 | 1.52 | 1.06 | 1.08 |

Note:
*Conventional method using N,N'-(m-phenylene) bismaleimide together with pretreating agent The following were confirmed from the measured results in Table 1.

First comparing Examples 1–4 with Comparative Examples 1–4, the fibrous materials according to the present invention each treated with the adhesive composition containing the bismaleimide compound at a specific mixing ratio had remarkably improved adhesion as compared with those each treated with the adhesive composition containing no bismaleimide compound irrespective of the kind of fibers.

It is understood from Examples 5–9 that the bismaleimide compound should not be limited to one kind.

It is further understood from Examples 10–13 and Comparative Example 5 that the mixing ratio of the bismaleimide compound used in the present invention to the rubber latex should be set in a range from 0.25/100 to 5/100.

Further, it is confirmed from Comparative Example 6 that when fiber materials were pretreated with the epoxy compound and the bismaleimide compound, and were then treated with an ordinary adhesive as in the ordinary technique, adhesion could not be improved as much as in the present invention.

Next, Examples and Comparative Examples given below were carried out to confirm effects obtained when a bismaleimide compound was also mixed into a rubber composition.

In the following, the above compounded rubber composition "a" blended with 2.0 parts by weight of N,N'-(m-phenylene)bismaleimide is called as compounded rubber composition "b".

EXAMPLE 14

Treatments and evaluations were carried out in the same manner as in Example 1 except that the compounded rubber "b" was used instead of the compounded rubber "a" in Example 1. Results obtained are shown in Table 2 below.

EXAMPLE 15

Treatments and evaluations were carried out in the same manner as in Example 14 except that 4,6-nylon was used instead of 6,6-nylon in Example 14. Results obtained are shown in Table 2 below.

EXAMPLE 16

Treatments and evaluations were carried out in the same manner as in Example 14 except that rayon fibers were used instead of 6,6-nylon in Example 14, and cords having a twisted construction of 1650 d/2 were obtained by twisting their 1500 d raw yarns at 50 turns/10 cm both for cable twisting and ply twisting 50/10 cm, and that the thermal treatment was effected at a high temperature of 160° C. for 60 seconds. Results obtained are shown in Table 2.

EXAMPLES 17 and 18

Treatments and evaluations of Examples 17 and 18 were carried out in the same manner as in Examples 3 and 4, respectively, except that the compounded rubber composition "b" was used instead of the compounded rubber composition "a" in Examples 3 and 4. Results obtained are shown in Table 2.

EXAMPLE 19

Twisted cords having a twisted construction of 1500 d/2 were obtained by twisting 1500 D raw yarns of polyethyleneterephthalate as a fiber material at 40 tuns/10 cm both for cable twisting and ply twisting.

Next, the thus obtained cords were immersed in an adhesive composition liquid "c" having the below-mentioned composition, dried at 160° C. for 60 seconds, and thermally treated at 235° C. for 60 seconds, thereby obtaining adhesive-treated cords. Then, the cords were treated and evaluated in the same manner as in Example 14. Results obtained are shown in Table 2.

Adhesive composition liquid "c"

|  | Parts by weight |
|---|---|
| Bismaleimide aqueous dispersion liquid (5%) (same as in Example 1) | 2.0 |
| Modified RF resin liquid (15%) | 50.0 |
| RFL liquid | 48.0 |
|  | 100.0 |

The above modified RF resin liquid was prepared by the following way.

(1) One hundred and ten parts by weight of resorcinol was dissolved into 500 parts by weight of toluene in a flask, to which 35 parts by weight of sulfur monochloride was dropwise added at a temperature of 25° C. in 3 hours under stirring. Then, the toluene was stationarily removed in 24 hours under reduced pressure, thereby obtaining viscous resorcinol polysulfide (A).

(2) In terms of weight, 110 parts of resorcinol, 0.62 part of oxalic acid, and 248 parts of water were charged into a flask, to which 50 parts of 37% formalin was dropwise added at 60° C. in one hour under stirring. Then, the stirring was further continued for 1 hour to obtain a resorcinol-formaldehyde condensate (B) containing excess resorcinol.

(3) When the resorcinol polysulfide (A) and the resorcinol excess resorcinol-formaldehyde condensate (B) were mixed at a ratio of 20:100 in terms of a solid component, the mixture contained 10.8% of the monomer. Eighteen parts by weight of the solid component was extracted from the mixture, and the modified RF resin liquid was obtained by adding 9 parts of 28% of an aqueous ammonia solution to the thus extracted solid component.

The RFL liquid was adjusted to have the following composition, and cured for 48 hours or more.

|  | Parts by weight |
|---|---|
| Water | 518.8 |
| Resorcinol | 11.0 |
| Formaldehyde (37%) | 16.2 |
| Ammonium hydroxide (28%) | 10.0 |
| Divinylpyridine-styrene-butadiene terpolymer rubber latex (41%) | 244.0 |

COMPARATIVE EXAMPLE 7

Treatments and evaluations were carried out in the same manners as in Example 14 except that the adhesive composition liquid "b" was used instead of the adhesive composition liquid "a" in Example 14. Results obtained are shown in Table 2.

EXAMPLES 20–24

Treatments and evaluations were carried out in the same manners as in Example 17 except that N,N'-ethylenebismaleimide, N,N'-(1,4-cyclohexylene)bismaleimide, N,N'-(1,4-naphthylene)bismaleimide, N,N'(2,4-pyridyl)bismaleimide, or N,N'-(4,4-diphenylether)bismaleimide was used instead of N,N'-(m-phenylene)bismaleimide aqueous dispersion liquid of Example 17. Results obtained are shown in Table 2.

EXAMPLES 25–28 and Comparative Example 8

Treatments and evaluations were carried out in the same manner as in Example 17 except that the mixing ratio of the bismaleimide compound to the rubber latex in the fiber material adhesive liquid in Example 17 was changed to 0.25/100, 2/100, 2.5/100, 5/100, or 6.5/100. Results obtained are shown in Table 2.

TABLE 2(a)

|  | Example 14 | Example 15 | Example 16 | Example 17 | Example 18 | Example 19 |
|---|---|---|---|---|---|---|
| Bismaleimide | N,N'-(m-phenylene) bismaleimide | N,N'-(m-phenylene) bismaleimide | N,N'-(m-phenylene) bismaleimide | N,N'-(m-phenylene) bismaleimide | N,N'-(m-phenylene) bismaleimide | N,N'-(m-phenylene) bismaleimide |
| Fiber | 6,6-nylon | 4,6-nylon | rayon | poly(1,4-terephthalamide) | polyethylene terephthalate | polyethylene terephthalate |
| Mixing ratio of bismaleimide/latex | 1/100 | 1/100 | 1/100 | 1/100 | 1/100 | 1/100 |
| Initial stage adhesion | 3.10 | 3.12 | 3.36 | 3.24 | 3.20 | 2.98 |
| Adhesion under high temperature | 2.22 | 2.12 | 2.32 | 2.26 | 2.28 | 2.18 |
| Adhesion when vulcanized at low temperature | 2.90 | 2.86 | 3.10 | 3.00 | 3.04 | 2.78 |

TABLE 2(b)

|  | Example 20 | Example 21 | Example 22 | Example 23 | Example 24 | Example 25 |
| --- | --- | --- | --- | --- | --- | --- |
| Bismaleimide | N,N'-ethylene bismaleimide | N,N'-(1,4-cyclohexylene) bismaleimide | N,N'-(1,4-naphthylene) bismaleimide | N,N'-(1,4-pyridyl) bismaleimide | N,N'-(1,4-diphenyl-bismaleimide | N,N'-(m-phenylene) bismaleimide |
| Fiber | poly(1,4-terephthalamide) | poly(1,4-terephthalamide) | poly(1,4-terephthalamide) | poly(1,4-terephthalamide) | poly(1,4-terephthalamide) | poly(1,4-terephthalamide) |
| Mixing ratio of bismaleimide/latex | 1/100 | 1/100 | 1/100 | 1/100 | 1/100 | 0.25/100 |
| Initial stage adhesion | 3.26 | 3.24 | 3.20 | 3.18 | 3.30 | 3.18 |
| Adhesion under high temperature | 2.28 | 2.22 | 2.30 | 2.18 | 2.26 | 2.18 |
| Adhesion when vulcanized at low temperature | 3.08 | 3.02 | 2.96 | 2.98 | 3.03 | 2.95 |

TABLE 2(c)

|  | Example 26 | Example 27 | Example 28 | Comparative Example 7 | Comparative Example 8 |
| --- | --- | --- | --- | --- | --- |
| Bismaleimide | N,N'-(m-phenylene) bismaleimide | N,N'-(m-phenylene) bismaleimide | N,N'-(m-phenylene) bismaleimide | — | N,N'-(m-phenylene) bismaleimide |
| Fiber | poly(1,4-terephthalamide) | poly(1,4-terephthalamide) | poly(1,4-terephthalamide) | 6,6-nylon | poly(1,4-terephthalamide) |
| Mixing ratio of bismaleimide/latex | 2/100 | 2.5/100 | 5/100 | 0/100 | 6.5/100 |
| Initial stage adhesion | 3.22 | 3.16 | 3.00 | 2.52 | 2.84 |
| Adhesion under high temperature | 2.24 | 2.20 | 2.18 | 1.36 | 1.62 |
| Adhesion when vulcanized at low temperature | 3.04 | 3.00 | 2.92 | 1.52 | 2.40 |

The following were confirmed from the measured results in Table 2.

It is first understood from Examples 14–19 that when the rubber-reinforcing fibrous material according to the present invention was buried in the rubber composition blended with a specified amount of the bismaleimide compound, adhesion was remarkably improved due to synergistic effects irrespective of the kind of fibers. However, it is understood from Comparative Example 7 that when the bismaleimide compound was used in the rubber composition only, adhesion could not be improved to the level in the present invention.

It was further confirmed from Examples 20–28 and Comparative Example 8 that the same as in the above-mentioned Examples 5–13 and Comparative Example 5 can be said.

EXAMPLES 29–47

Treatments and evaluation of adhesion at high temperature were carried out in the same manners as in Example 3 except that a rubber composition having a mixing ratios (parts by weight) shown in the following Table 3 was used instead of the compounded rubber composition "a" in Example 3. Results obtained are also shown in Table 3.

TABLE 3(a)-1

|  | Example No. | | | | | | | | | |
| --- | --- | --- | --- | --- | --- | --- | --- | --- | --- | --- |
|  | 29 | 30 | 31 | 32 | 33 | 34 | 35 | 36 | 37 | 38 |
| Natural rubber | 100 | 100 | 100 | 100 | 100 | 100 | 100 | 100 | 100 | 100 |
| Polybutadiene rubber (BR 01) | — | — | — | — | — | — | — | — | — | — |
| Styrene-butadiene rubber (SBR 1500) | — | — | — | — | — | — | — | — | — | — |
| HAF-carbon black | 42 | 42 | 42 | 42 | 42 | 42 | 42 | 42 | 42 | 42 |
| Zinc oxide | 5.0 | 5.0 | 5.0 | 5.0 | 5.0 | 5.0 | 5.0 | 5.0 | 5.0 | 5.0 |
| Stearic acid | 1.2 | 1.2 | 1.2 | 1.2 | 1.2 | 1.2 | 1.2 | 1.2 | 1.2 | 1.2 |
| Process oil | — | — | — | — | — | — | — | — | — | — |
| Antioxidant: (1,2-dihydro-2,2,4-trimethylquinolin) | 0.7 | 0.7 | 0.7 | 0.7 | 0.7 | 0.7 | 0.7 | 0.7 | 0.7 | 0.7 |
| Vulcanization accelerator: dibenzothiazyl difuldie | 0.6 | 0.6 | 0.6 | 1.0 | 0.6 | 0.6 | 0.6 | 0.6 | 0.6 | — |
| N-oxydiethylene-benzothiazyl-2-sulfenamide | 0.4 | 0.4 | 0.4 | — | 0.4 | 0.4 | 0.4 | 0.4 | 0.4 | — |

TABLE 3(a)-2

|  | Example No. |  |  |  |  |  |  |  |  |  |
|---|---|---|---|---|---|---|---|---|---|---|
|  | 29 | 30 | 31 | 32 | 33 | 34 | 35 | 36 | 37 | 38 |
| Cyclohexyl-benzothiazyl sulfenamide | — | — | — | — | — | — | — | — | — | 0.8 |
| Dicyclohexyl-benzothiazyl sulfenamide | — | — | — | — | — | — | — | — | — | — |
| Sulfur | 2.8 | 2.8 | 2.8 | — | 1.0 | 6.0 | 6.0 | 6.0 | 6.0 | 2.8 |
| N,N'-(m-phenylene) bismaleimide | 1.0 | 3.0 | 9.0 | 4.0 | 3.0 | — | 1.5 | 3.0 | 6.0 | 2.0 |
| N,N'-hexamethylene bismaleimide | — | — | — | — | — | — | — | — | — | — |
| N,N'-ethylene bismaleimide | — | — | — | — | — | — | — | — | — | — |
| N,N'-(p-phenylene) bismaleimide | — | — | — | — | — | — | — | — | — | — |
| N,N'-4,4'-diphenylmethane bismaleimide | — | — | — | — | — | — | — | — | — | — |
| Adhesion at high temperatures | 2.20 | 2.22 | 2.00 | 1.62 | 2.32 | 1.80 | 2.16 | 2.12 | 2.08 | 2.18 |

TABLE 3(b)-1

|  | Example No. |  |  |  |  |  |  |  |  |
|---|---|---|---|---|---|---|---|---|---|
|  | 39 | 40 | 41 | 42 | 43 | 44 | 45 | 46 | 47 |
| Natural rubber | 100 | 100 | 80 | 100 | 100 | 100 | 100 | 100 | 100 |
| Polybutadiene rubber (BR 01) | — | — | — | — | — | — | — | — | 20 |
| Styrene-butadiene rubber (SBR 1500) | — | — | 20 | — | — | — | — | — | — |
| HAF-carbon black | 42 | 42 | 45 | 42 | 42 | 42 | 42 | 42 | 42 |
| Zinc oxide | 5.0 | 5.0 | 7.5 | 5.0 | 5.0 | 5.0 | 5.0 | 5.0 | 5.0 |
| Stearic acid | 1.2 | 1.2 | 2.0 | 1.2 | 1.2 | 1.2 | 1.2 | 1.2 | 1.2 |
| Process oil | — | — | 12.0 | — | — | — | — | — | — |
| Antioxidant: (1,2-dihydro-2,2,4-trimethylquinolin) | 0.7 | 0.7 | 0.7 | 0.7 | 0.7 | 0.7 | 0.7 | 0.7 | 0.7 |
| Vulcanization accelerator: dibenzothiazyl difuldie | 0.6 | 0.6 | 0.3 | 0.6 | 0.6 | 0.6 | 0.6 | 0.6 | — |
| N-oxydiethylene-benzothiazyl-2-sulfenamide | 0.4 | 0.4 | 0.4 | 0.4 | 0.4 | 0.4 | 0.4 | 0.4 | — |

TABLE 3(b)-2

|  | Example No. |  |  |  |  |  |  |  |  |
|---|---|---|---|---|---|---|---|---|---|
|  | 39 | 40 | 41 | 42 | 43 | 44 | 45 | 46 | 47 |
| Cyclohexyl-benzothiazyle sulfenamide | — | — | — | — | — | — | — | — | — |
| Dicyclohexyl-benzothiazyle sulfenamide | — | — | — | — | — | — | — | — | 0.8 |
| Sulfur | 12.0 | 2.8 | 3.0 | 2.8 | 2.8 | 2.8 | 2.8 | 2.8 | 2.8 |
| N,N'-(m-phenylene) bismaleimide | 2.0 | 11.0 | 2.0 | 2.0 | — | — | — | — | 3.0 |
| N,N'-hexamethylene bismaleimide | — | — | — | — | 2.0 | — | — | — | — |
| N,N'-ethylene bismaleimide | — | — | — | — | — | 2.0 | — | — | — |
| N,N'-(p-phenylene) bismaleimide | — | — | — | — | — | — | 2.0 | — | — |
| N,N'-4,4'-diphenylmethane bismaleimide | — | — | — | — | — | — | — | 3.0 | — |
| Adhesion at high temperatures | 1.84 | 1.90 | 2.36 | 2.24 | 2.26 | 2.30 | 2.28 | 2.18 | 2.30 |

It is understood from the measured results of Examples 29–47 in Table 3 that any limitation should not be posed upon a rubber composition to which the rubber-reinforcing fibrous material may be applied.

As having been explained above, the rubber-reinforcing fibrous materials according to the present invention can afford excellent heat resistance, mechanical fatigue resistance, and resistance against dependency upon vulcanization temperature between the rubber-reinforcing fibrous materials and the covering rubber. Further, when a specific amount of the bismaleimide compound is also blended into the covering rubber, more excellent heat resisting adhesion can be afforded due to the synergistic effects between the adhesive compound.

Therefore, the rubber reinforcing fibrous materials according to the present invention may be used in all sorts of rubber products such as tires, conveyor belts, hoses, and air springs.

What is claimed is:

1. A rubber-reinforcing fibrous material consisting essentially of fibers and a coat formed on said fibers, said coat being formed by applying a rubbery adhesive composition on the fibers and then thermally treating the resulting rubbery adhesive composition-applied fibers, said rubbery adhesive composition consisting essentially of rubber latex and a bismaleimide compound at a mixing ratio of 0.25 to 5 parts by weight of said bismaleimide compound to 100 parts by weight of said rubber latex, wherein said rubber latex contains a resin having methylene doners selected from the group consisting of:
   (i) a resorcinol type formaldehyde resin selected from the group consisting of a resorcinol-formaldehyde resin, a melamine-formaldehyde resin, and a urea-formaldehyde resin; and
   (ii) a resorcinol-formaldehyde (RF) initial stage condensate obtained by reaction between resorcinol and formaldehyde in the presence of an alkaline catalyst.

2. A rubber reinforcing fibrous material according to claim 1, wherein the bismaleimide compound is selected from the group consisting essentially of N,N'-ethylenebismaleimide, N,N'-hexamethylenebismaleimide, N,N'-dodecamethylenebismaleimide, N,N'(2,2,4-trimethylhexamethylene)bismaleimide, N,N'-(oxydipropylene)bismaleimide, N,N'-(amino-dipropylene)bismaleimide, N,N'-(ethylene-dioxy-dipropylene)bismaleimide, N,N'-(1,4-cyclohexyl)bismaleimide, N,N'-(1,3-cyclohexylene)bismaleimide, N,N'-(methylene-1,4dicyclohexylene)bismaleimide, N,N'-(isopropylidene-1,4 dicyclohexylene)bismaleimide, N,N'-(m phenylene)bismaleimide, N,N'-(p-phenylene)bismaleimide, N,N'-(o-phenylene)bismaleimide, N,N'-(1,3-naphthylene)bismaleimide, N,N'-(1,4-naphthylene)bismaleimide, N,N'-(1,5-naphthylene)bismaleimide, N,N'-(3,3-dimethyl-4,4biphenylene)bismaleimide, N,N'-(3,3-dichloro-4,4bisphenylene)bismaleimide, N,N'-(2,4-pyrydyl)bismaleimide, N,N'-(m-tolylene)bismaleimide, N,N'-(4,6dimethyl 1,3-phenylene)bismaleimide, N,N'-(4,4-diphenylmethane)bismaleimide, N,N'-(4,4'-diphenylether)bismaleimide, N,N'-(4,4-diphenylsulfone)bismaleimide, N,N'-(4,4-diphenyldithio)bismaleimide.

3. A rubber-reinforcing fibrous material according to claim 1, wherein the thermal treatment is effected at a range of from not less than the Tg of a polymer constituting the fibers to 250° C. or less.

4. A rubber-reinforcing fibrous material according to claim 1, wherein the thermal treatment is effected at not less than 100° C. but not more than 250° C.

5. A rubber-reinforcing fibrous material according to claim 1, wherein said fibers are selected from the group consisting essentially of aliphatic polyamide fibers, polyester fibers, aromatic polyamide fibers, and inorganic fibers.

6. A rubber-reinforcing fibrous material according to claim 5, wherein said fibers are fibers selected from the group consisting essentially of rayon, vinylon, 6-nylon, 6,6-nylon, 4,6-nylon, polyethylene terephthalate fibers, paraphenylene terephthalimide, carbon fibers, and glass fibers.

7. A vulcanized rubber reinforced with the fibrous material of claim 1, wherein said vulcanized rubber comprises a rubber component and a bismaleimide compound.

8. A vulcanized rubber according to claim 7, wherein said bismaleimide compound in said vulcanized rubber is employed in an amount of from 0.5 to 10 parts by weight per 100 parts of said rubber component.

9. A rubber-reinforcing fibrous material according to claim 1, wherein said fibrous material is in the form of a cord, a cable, a filament, a chip of a filament, a cord fabric or a canvass.

* * * * *